T. W. MURPHY.
HORSESHOE.

No. 173,326.

Patented Feb. 8, 1876.

Witnesses:
C. Clarence Poole
D. G. Weems

Inventor:
T. W. Murphy
per Atty.
A. H. Evans &c.

UNITED STATES PATENT OFFICE.

TIMOTHY W. MURPHY, OF WASHINGTON, DISTRICT OF COLUMBIA.

IMPROVEMENT IN HORSESHOES.

Specification forming part of Letters Patent No. 173,326, dated February 8, 1876; application filed January 21, 1876.

*To all whom it may concern:*

Be it known that I, TIMOTHY W. MURPHY, of Washington, D. C., have invented certain new and useful Improvements in Horseshoes, of which the following is a full, clear, and exact description, reference being had to the accompanying drawings, making a part of this specification, in which—

Figure 1:
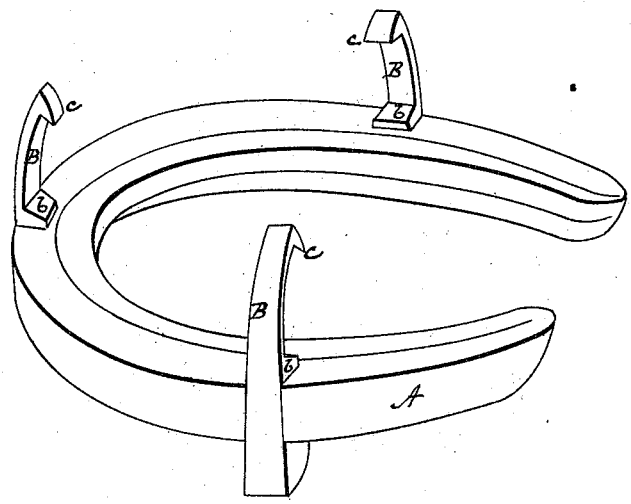
Figure 2:
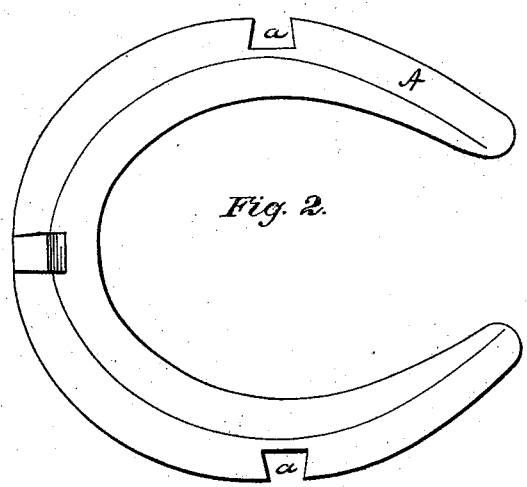
Figure 3:
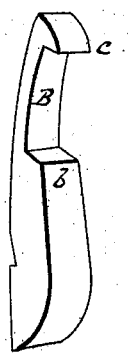

Figure 1 is a perspective view of my improved shoe. Fig. 2 is a plan view with side clips removed. Fig. 3 is a detached view of the clip.

My invention relates to that class of horseshoes to be fastened to the hoof of the animal without nails or screws; and it consists in the combination of devices, hereinafter described and claimed.

To enable others skilled in the art to make and use my invention, I will proceed to describe the exact manner in which I have carried it out.

In the drawings, A represents a shoe-plate, provided with the countersunk dovetail vertical grooves $a\ a\ a$, these grooves being larger at the bottom than at the top. The clips or fastenings B B B are provided with corresponding tenons $b\ b\ b$, fitting snugly into the grooves $a\ a\ a$, and these clips may have their tenons extended downward, so as to form heel and toe calks for the shoe, while at the upper end they have the small projections or hooks $c\ c\ c$, which fit into corresponding recesses in the hoof, for the purpose of securing the shoe in position. These hooks may have the additional security of a small screw passing through the clip into the hoof; or a narrow spring-steel band may be made to encompass the clips, and be secured by the screws passing through the clips.

Having thus described my invention, what I claim as new, and desire to secure by Letters Patent, is—

The plate A, provided with the countersunk dovetail vertical grooves $a\ a\ a$, in combination with the clips B B B, provided with corresponding tenons, substantially as and for the purpose set forth.

TIMOTHY W. MURPHY.

Witnesses:
WILL. H. MOXON,
JOS. U. BURKET.